United States Patent
Breed (10) Patent No.: US 6,343,821 B2
(45) Date of Patent: *Feb. 5, 2002

(54) DAMPED CRASH ATTENUATOR

(75) Inventor: David S. Breed, Boonton Township Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,712

(22) Filed: Mar. 19, 2001

Related U.S. Application Data (63) Continuation of application No. 09/200,367, filed on Nov. 23, 1998, now Pat. No. 6,203,079.
(60) Provisional application No. 60/066,486, filed on Nov. 24, 1997.

(51) Int. Cl.$^7$ .............................. B60R 19/40; F16F 7/10
(52) U.S. Cl. ..................... 293/119; 293/132; 293/134; 293/139; 256/13.1; 188/377; 404/10
(58) Field of Search ................................ 293/132, 134, 293/119; 404/6, 10; 188/377, 371; 256/13.1; 267/139

(56) References Cited

U.S. PATENT DOCUMENTS

| | | | |
|---|---|---|---|
| 626,480 A | 6/1899 | Bemelmans | 293/119 X |
| 2,984,512 A | 5/1961 | Shaginaw | 293/119 |
| 4,190,275 A | 2/1980 | Mileti | 293/102 |
| 4,562,894 A | 1/1986 | Yang | 293/112 X |
| 4,635,981 A | 1/1987 | Friton | 293/1 |
| 4,674,911 A | 6/1987 | Gertz | 404/6 |
| 4,711,481 A | 12/1987 | Krage et al. | 293/133 |
| 4,881,270 A | 11/1989 | Knecht et al. | 382/17 |
| 5,052,732 A | 10/1991 | Oplet et al. | 293/102 |
| 5,101,927 A | 4/1992 | Murtuza | 293/119 X |
| 5,192,157 A | 3/1993 | Laturner | 404/6 |
| 5,199,755 A | 4/1993 | Gertz | 293/120 |
| 5,214,744 A | 5/1993 | Schweizer et al. | 395/21 |
| 5,235,339 A | 8/1993 | Morrison et al. | 342/159 |
| 5,248,129 A | 9/1993 | Gertz | 256/13.1 |
| 5,390,136 A | 2/1995 | Wang | 364/754 |
| 5,403,112 A | 4/1995 | Carney, III | 404/6 |
| 5,564,359 A | 10/1996 | Harder | 116/28 R |
| 5,642,792 A | 7/1997 | June | 188/377 |
| 5,673,953 A | 10/1997 | Spease | 293/118 |

(List continued on next page.)

FOREIGN PATENT DOCUMENTS

| | | |
|---|---|---|
| DE | 1239581 | 4/1967 |
| EP | 0568017 | 11/1993 |
| GB | 2289786 | 11/1995 |
| GB | 2301922 | 12/1996 |
| WO | 092009456 | 4/1967 |

OTHER PUBLICATIONS

Abstract of US Patent No. 3,764,115 (Young et al.), Jul. 4, 1972.

"A Smart Airbag System", David S. Breed, Presented At The 16$^{th}$ International Technical Conference On The Enhanced Safety Of Vehicles, Jun. 3, 1998, Windsor, Canada.

Primary Examiner—Joseph D. Pape
(74) Attorney, Agent, or Firm—Brian Roffe (57) ABSTRACT

A crash attenuator for protecting a truck or stationary structure from damage resulting from impact of an object such as a vehicle including a fame mountable to a truck or stationary structure, a bumper having an impact-receiving face adapted to receive an impact from an object in a crash, a movable displacement structure coupled to the frame and interposed between the frame and the bumper and having a first position in which the bumper is relatively distant from the frame and a second position in which the bumper is relatively proximate to the frame, and an energy dissipation system coupled to the displacement structure for dissipating the impact energy of the object into the bumper which causes the displacement structure to be moved from the first position toward the second position.

25 Claims, 7 Drawing Sheets

U.S. PATENT DOCUMENTS

| | | |
|---|---|---|
| 5,694,320 A | 12/1997 | Breed .................. 364/424.055 |
| 5,711,561 A | 1/1998 | Boysen ....................... 293/116 |
| 5,810,427 A | 9/1998 | Hartmann et al. ...... 293/119 X |
| 5,860,385 A | 1/1999 | Lamparter ................ 116/28 R |
| 5,951,073 A | 9/1999 | Hall ........................... 293/119 |
| 5,967,573 A | 10/1999 | Wang ......................... 293/119 |
| 6,056,336 A | 5/2000 | Balgobin .................... 293/197 |
| 6,059,330 A | 5/2000 | Moffett et al. .............. 293/118 |
| 6,106,038 A | 8/2000 | Dreher ....................... 293/118 |
| 6,174,008 B1 | 1/2001 | Kramer et al. .............. 293/118 |
| 6,189,941 B1 | 2/2001 | Nohr .......................... 293/118 |
| 6,224,120 B1 | 5/2001 | Eipper et al. ............... 293/118 |

DAMPED CRASH ATTENUATOR

CROSS REFERENCE TO RELATED APPLICATIONS

This application is a continuation of U.S. patent application Ser. No. 09/200,367 filed Nov. 23, 1998, now U.S. Pat. No. 6,203,079.

This application claims domestic priority of U.S. provisional patent application Ser. No. 60/066,486 filed Nov. 24, 1997 through the '367 application.

FIELD OF THE INVENTION

The present invention relates in general to crash attenuators, and more particularly to medium-damped crash attenuators that use the flow of a medium such as a liquid or gas to dissipate the energy of an object such as a vehicle impacting the crash attenuator. Still more particularly, the invention relates to attenuators enabling active control of the rate of energy dissipation thereof to better control the deceleration of vehicles impacting the attenuator having widely varying kinetic energy.

The present invention also relates to method for protecting fixed structures from damage caused by the impact of objects such as vehicles, e.g., structures situated alongside highways.

BACKGROUND OF THE INVENTION

Many commercial products exist and numerous patents have been issued directed to the design and construction of impact attenuators or barriers to control the deceleration of an errant vehicle as it approaches an obstruction or hazard on, or adjacent to, a highway. Several prior art patents will be discussed below. This invention is concerned primarily with impact attenuators that are mounted on the rear of a construction vehicle, commonly called truck-mounted attenuators (TMA), although it is not limited thereto. The invention also has applicability to more permanent attenuator installations such as those of the type used around fixed highway structures especially where space is limited.

A review of some patents and commercial literature of TMAs illustrates a wide variety of designs which appear to have evolved by trial and error with little attempt to optimize the design to handle a wide variety of impacting vehicle kinetic energies. Thus, such existing devices generally have a fixed force versus deflection function that provides the same resisting force to the impacting vehicle regardless of that vehicle's mass or velocity.

The primary purpose of a TMA is to protect construction personnel from death or injury caused by a vehicle which mistakenly or accidentally intrudes into a construction zone. Secondarily, the TMA is designed to minimize the death and injury to the occupants of the errant vehicle. Ideally, the TMA should capture the impacting vehicle preventing it from being diverted either into adjacent traffic or off the road where it might impact a roadside structure such as a utility pole. Preferably, the TMA should even decelerate the vehicle at an acceptable level, such as 15 Gs, regardless of the mass or velocity of the impacting vehicle. Additionally, it is desirable for the TMA to be low cost, reusable after an impact, easily transported, light weight, easily shipped, easily stored, etc. No TMA on the market today satisfactorily meets all of these requirements. Therefore, there is a dire need for such a TMA that is the subject of this invention.

It is clear from the patents and commercial literature that many mechanisms exist for absorbing energy of an impacting vehicle into a TMA. These include a variety of structures that depend on the bending of metal or plastic, devices that utilize water, foam rubber, plastic etc. in a variety of energy absorption modes. Frequently, the energy dissipated by the system is part of the structure of the device. In fact, the prior art inventions have frequently confused the functions of structure and energy absorption. The instant invention therefore centers on the separation of these two functions of supporting structure and energy dissipation and optimizing these functions separately.

The basic problem to be solved by a TMA design is to capture an impacting vehicle and to decelerate it at an approximate constant value that is relatively independent of the velocity and mass of the impacting vehicle. It is also desirable for the impactor to be resetable and that it can be easily collapsed for transportation, shipping, storage etc. It is noteworthy that none of the TMAs on the market today are reusable and therefore invariably require replacement after an impact.

Review of the prior art:

U.S. Pat. No. 3,674,115 to Young et al. describes a liquid filled shock absorber comprised of many tubes each with a fixed orifice. On impact of a vehicle into the shock absorber, the fluid is forced to flow through the orifices which provides the energy dissipation. Since the orifices are fixed, the system will not adjust to vehicle impacts of varying kinetic energy to provide a constant deceleration. Also, since the device is substantially composed of such cylinders, it is heavy if used as a TMA. It is designed, therefore, for use in fixed installations.

U.S. Pat. No. 4,190,275 to Mileti describes a light weight reusable TMA which is self restoring and thus immediately available to receive an additional impact. The impact attenuator is constructed from a plurality of expanded plastic sheets sandwiched between plywood stiffeners. The expanded plastic sheets form air filled cells. The energy dissipation mechanism is not disclosed but it appears that the energy is stored as compressed gas within the cells rather than dissipated. Thus, there is a substantial force at the end of the crash to cause the impacting vehicle to change its direction and rebound at a substantial velocity off of the TMA thus substantially increasing the velocity change of the vehicle above the initial vehicle impact velocity. This increases the severity of the crash and thus the potential for injury to the construction crew and the vehicle occupants. There is no provision in this patent to adjust the force on the impacting vehicle so that substantially the same deceleration is achieved for vehicles of different kinetic energy. This has the effect of substantially increasing the length required of the device in order to handle both light and heavy impacting vehicles at high velocities. The first part of the TMA must be designed to decelerate a light, high speed vehicle at a safe level. This same force is then all that is available for the heavy vehicle which is then decelerated at a much lower level during the initial part of the crush and then at a higher level later.

U.S. Pat. No. 4,635,981 to Friton describes an attenuator including a series of chambers made from sheet metal with some of the chambers containing crushable plastic foam, which, along with the plastic deformation of the sheet metal, dissipates the kinetic energy of the impacting vehicle. The system is not reusable and does not adjust to impacting vehicles having different kinetic energies.

U.S. Pat. No. 4,674,911 to Gertz describes a crash cushion which uses the compression of air to act as a spring to provide an ever increasing force acting against the impacting vehicle. This system is reusable but does not adjust to impacting vehicles having different kinetic energies. By having the function of an ever increasing force with displacement, it is particularly inefficient in decelerating a vehicle where a constant force is desired.

U.S. Pat. No. 4,711,481 to Krage et al. describes an attenuator that uses the crushing or plastic deformation of sheet metal to provide the energy dissipation. This system is not reusable and does not adjust to impacting vehicles having different kinetic energies. By having the function on an ever increasing force with displacement, it is particularly inefficient in decelerating a vehicle where a constant force is desired.

U.S. Pat. No. 5,052,732 to Oplet et al. describes an attenuator which uses a plurality of layers of fibrous hexagonal elongate cells which provides energy absorption during crushing. It suffers from the same defects at Krage et al. (U.S. Pat. No. 4,711,481).

U.S. Pat. No. 5,101,927 (Murtuza) describes an automatic brake actuation device including a "feeler" which extends forward of a vehicle and detects objects that the vehicle is about to strike. Upon detecting an object, the device actuates the brakes of the vehicle to bring the vehicle to rest. Also, upon impact with the object, the feeler is retracted without applying any force against such retraction. One stated object of the Murtuza invention is to provide an improved automatic brake actuation system wherein the extendable detector is retracted upon impacting an object. More particularly, in the embodiment shown in FIGS. 13 and 14, the device includes a support member 112 mounted to the vehicle and a feeler cylinder 114 having a piston 118 therein. Movement of the piston 118 controls expansion and retraction of a parallel-bar expanding feeler 130. Movement of the piston is obtained by forcing fluid into a retracting portion 128 of the cylinder 114 while fluid is vented from the extending portion 126 and vice versa. This is achieved by providing fluid controls to act as extending means or devices and retracting means or devices for supplying fluid under pressure to the feeler cylinder.

U.S. Pat. No. 5,192,157 to Laturner describes a fixed installation vehicle crash barrier that attempts to make use of a more efficient method of deforming metal to absorb energy. It also suffers from the same limitations as Krage et al. (U.S. Pat. 4,711,481).

U.S. Pat. No. 5,199,755 to Gertz describes a TMA that also uses the bending of metal as the main energy absorption mechanism and thus has the same limitations as Krage et al. (U.S. Pat. 4,711,481).

U.S. Pat. No. 5,403,112 to Carney describes a TMA where part of the structure is a scissors mechanism. The bending of metal is the energy absorption mechanism and thus has the same limitations as Krage et al. (U.S. Pat. 4,711,481).

U.S. Pat. No. 5,642,792 to June describes a TMA using large drum shaped plastic cylinders to provide an energy absorption system. The system is not reusable and does not adjust to the kinetic energy of the impacting vehicle.

Accordingly, none of the prior art patents mentioned above discloses a TMA having the sought after properties and thus, a critical need exists for such a device. A central issue is that since prior art TMAs are not optimally designed, they must be made very long in order to handle both low and high mass vehicles at high speed. This makes the devices expensive, difficult to maneuver and less than optimum as a life saving device.

OBJECTS OF THE INVENTION

It is an object of the present invention to provide a new and improved crash attenuator for mounting on a truck or a stationary structure.

It is another object of the present invention to provide a new and improved crash attenuator for mounting on a truck of stationary structure which is reusable.

It is another object of the present invention to provide a new and improved crash attenuator for mounting on a truck or a stationary structure which adjusts to the kinetic energy of a vehicle impacting into the same.

It is still another object of the present invention to provide a new and improved crash attenuator for mounting on a truck or a stationary structure which is efficient in decelerating a vehicle impacting into the attenuator where a constant deceleration is desired.

It is yet another object of the present invention to provide a new and improved crash attenuator for mounting on a truck or a stationary structure that separates the functions of the supporting structure and the energy dissipation and optimizes these functions separately.

It is another object of the present invention to provide a new and improved crash attenuator for mounting on a truck or a stationary structure which enables active control of the rate of energy dissipation in order to better control the deceleration of vehicles impacting the attenuator having widely varying kinetic energy.

It is a further object of the present invention to provide a new and improved crash attenuator for mounting on a truck or a stationary structure which is low cost, reusable after an impact, easily transported, light weight, easily shipped and easily stored.

SUMMARY OF THE INVENTION

The crash attenuators in accordance with this invention are first designed as a structural mechanism which is capable of supporting the loads arising from the impact of a vehicle and the resulting reaction loads arising from the truck inertial loading and the energy dissipation or damping device. The damping device is then designed which may be either one or more hydraulic cylinders and/or one or more inflatable/deflatable airbags. This separates the structural function from the energy dissipation function and permits the optimization of each separately. In both cases, a movable displacement structure is provided to enable movement of a bumper having an impact-receivmg face toward and away from a frame connected to the truck or stationary structure. The displacement structure may comprise a scissors mechanism that has an expanded condition in which the bumper is distant from the frame and a contracted condition in which the bumper is relatively close to the frame. Similar scissors mechanisms have found a successful application for cases of load lifting in industrial settings. The energy dissipation device is coupled to the scissors mechanism and can be either hydraulic or pneumatic, although the hydraulic design is preferred for most applications.

This approach was only partially implemented in U.S. Pat. No. 5,248,129 to Gertz wherein a scissors mechanism is coupled with energy absorbing elements and in U.S. Pat. No. 5,642,792 to June wherein a hinged support frame supports an energy absorbing rectangular box-like structure. The preferred design of a crash attenuator in accordance with the invention combines a scissors or other expandable structure containing a plurality of sections, preferably at least three or four sections, with hydraulic damping cylinders. In a second design of a crash attenuator in accordance with the invention, the scissors mechanism houses at least one inflatable airbag which may be in the form of an accordion structure with the various sections of the airbag internally tethered for shape retention. Other shape retention means may also be provided in connection with the airbag(s).

An electronic control module may be incorporated onto the scissors mechanism in order to sense the motion of an impacting vehicle and control the opening of exhaust orifices associated with the hydraulic or pneumatic energy dissipation device in order to achieve a substantially constant deceleration of the vehicle regardless of the mass and velocity of the impacting vehicle. The cross section area of the airbag(s) will be made as large as possible in the pneumatic case in order to minimize the initial compression of the airbag(s) before maximum pressure is obtained. The motion sensing system may be ultrasonic, radar or lidar based, or preferably accelerometer based. An electronically controlled valve is used to control the flow of either the hydraulic fluid or other medium from hydraulic cylinders in the hydraulic case, or gas or other medium out of the airbag(s) for the pneumatic case, during impact.

The system functions as follows. In the collapsed state, the TMA will occupy a space of typically approximately 25% of its expanded state maling it easy to transport, store and ship. It could occupy any amount less than about 50% of its expanded state. This is facilitated by the use of a scissors mechanism comprises linked members articulated to one another. Upon arrival at the work site, a hydraulic pump in the hydraulic case, or small vacuum cleaner type pump for the pneumatic case, will be activated to expand the TMA to its extended state where it is ready to receive an impact. The scissors mechanism will thus be expanded as the hydraulic pump is actuated to extend pistons associated therewith, the cylinder and piston of each hydraulic cylinder being connected to different parts of the scissors mechanism, or the airbag(s) is(are) inflated.

Bumpers at the end of the TMA, made from a material such as polyurethane foam, provide a low level of energy absorption for low speed impacts. At higher speeds, a deformable subbumper structure can be used to help channel the vehicle into the center of the TMA and capture it to prevent it from being deflected off of the TMA. Accelerometers located in the rear of the bumper structure sense the deceleration of the bumper, and thus the deceleration of the impacting vehicle. These accelerometers send signals to the control module, which then adjusts the valve or orifice openings to control the fluid outflow from the hydraulic cylinders or medium outflow from the airbag(s) and thereby vary the energy dissipation force provided by the energy dissipation device and as a result, the vehicle deceleration. In the hydraulic embodiment, the rate of fluid outflow will be reflected in the movement of the piston back into the cylinder. In this manner, the system will provide a large energy dissipation force when the impacting vehicle is a heavy vehicle and a lower energy dissipation force for light vehicles, thus approximately stopping both types of vehicles in the same distance for the same velocity of impact. This permits a more efficient utilization of the available crush space and thus minimizes the size of the TMA.

Some loss of efficiency results from the initial compressibility of the gas in the airbag for the pneumatic case. However, calculations set forth in Appendix 1 show that this loss of efficiency is manageable without greatly increasing the length of the TMA if atmospheric pressure is used. To the extent that the airbag can be pressurized, this effect will become smaller. Other energy absorption mechanisms that provide a force in parallel at least during the compression stage can of course be added to help compensate for this compressibility effect.

Another concern of the pneumatic system is in the compliance of the airbag itself Once again, calculations indicate that this should not be a significant problem if the airbag is properly designed. In some cases, an accordion design with simple tethering will prove to be insufficient and a design based on a self-shaping airbag design, as disclosed in U.S. Pat. No. 5,653,464 incorporated herein by reference, which solves the problem by properly shaping the airbag to cause it to naturally take on the desired shape.

Although the preferred design uses electronics to control the valve associated with the hydraulic cylinders or orifice opening(s) associated with the airbag(s), other variations include the use of a mechanical system to sense the acceleration and control the opening of the flow restrictors, i.e., the valve or orifice openings. This results in an all-mechanical system by eliminating the electronics. The all-mechanical system is particularly applicable for fixed installations in addition to truck mounted applications.

In one method for protecting a truck or fixed structure in accordance with the invention, a movable displacement structure is mounted to the truck or structure and has an expanded position and a contracted position. A bumper having an impact-receiving face adapted to receive an impact from an object in a crash is arranged on the displacement structure. The displacement structure is preferably stored and transported in its contracted condition and when readied for use, it is expanded to its expanded position. In use, impact of an object into the bumper which causes the displacement structure to be moved from the expanded position toward the contract position is sensed and at least some, if not all, of the impact energy of the object is dissipated by adjusting an energy dissipation force such that the object is brought to rest. In some preferred embodiments, the displacement structure may be expanded after the impact energy of the object is dissipated such that the crash attenuator is reusable.

It is possible to sense deceleration of the object after impact into the bumper and adjust the energy dissipation force based on the sensed deceleration of the object. The hydraulic and pneumatic systems described herein may be applied.

BRIEF DESCRIPTION OF THE DRAWINGS

The invention will be described with reference to the accompanying non-limiting drawings wherein.

DETAILED DESCRIPTION OF THE PREFERRED EMBODIMENTS

Referring to the accompanying drawings wherein like reference numerals refer to the same or similar elements, FIGS. 1–4 show a first embodiment of a crash attenuator in accordance with the invention denoted generally as 10. The crash attenuator 10 is mounted to a vehicle such as a truck 12, most often so that it faces rearward of the truck 12. As such, it will protect the truck 12 from damage resulting from a vehicular impact from the rear of the truck 12. The crash attenuator 10 is secured to the truck 12 by conventional mounting means, e.g., bolts, screws, welding, clamps.

The typical size of the crash attenuator 10 when mounted to a standard size truck is about eight feet wide, fifteen feet long and two and one half feet high in the expanded condition. The crash attenuator 10 is preferably designed so that the center of pressure is about 23 inches off ground.

The crash attenuator 10 includes a rigid frame 14 comprising a pair of spaced apart, parallel beams 16 extending substantially perpendicular to the rear of the truck 12, a cross beam 18 for connecting the beams 16 to provide stability thereto and a rigid support beam structure 20 arranged at a rearward end of the beams 16 and connected thereto. Beams 16 are connected to a suitable surface of the truck 12. A diagonal beam 22 is arranged at each side of the frame 14 (only one of which is shown) and is connected to the beam structure 20 to provide stability for the same. The beam structure 20 comprises an upper horizontal beam 24, a lower horizontal beam 26 parallel to the upper horizontal beam 24 and spaced therefrom and three spaced apart, parallel vertical beams 28 connecting the upper and lower horizontal beams 24,26. A substantially rigid plate 30 is connected to one or more of the beams 24,26,28 and serves as a connecting surface to which ends of the beams 16 and 22 are attached. The connections between the beams and plates, which are preferably made of a metal material, may be in any suitable manner, e.g., by welds, screws, etc.

Figure 1:
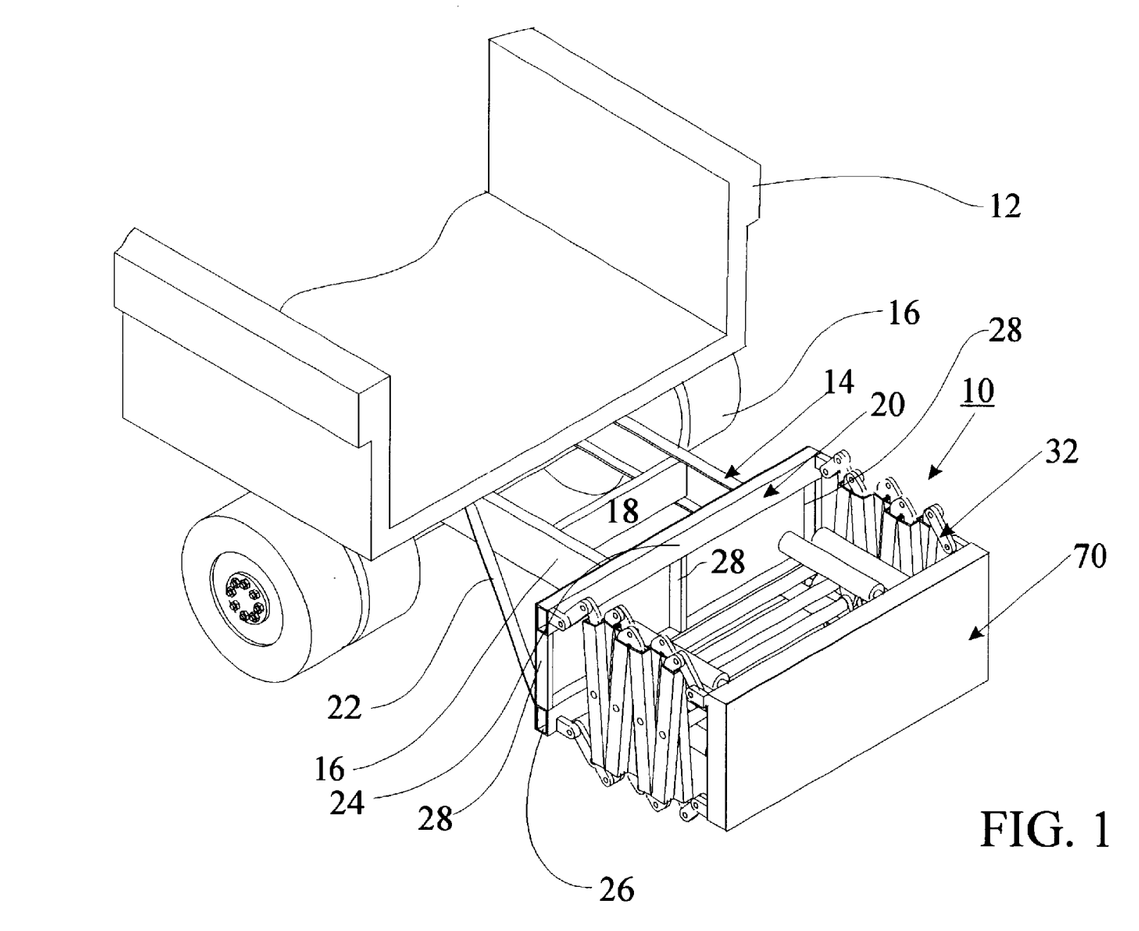
FIG. 1 shows a first embodiment of a crash attenuator in accordance with the invention in its contracted condition.
Figure 2:
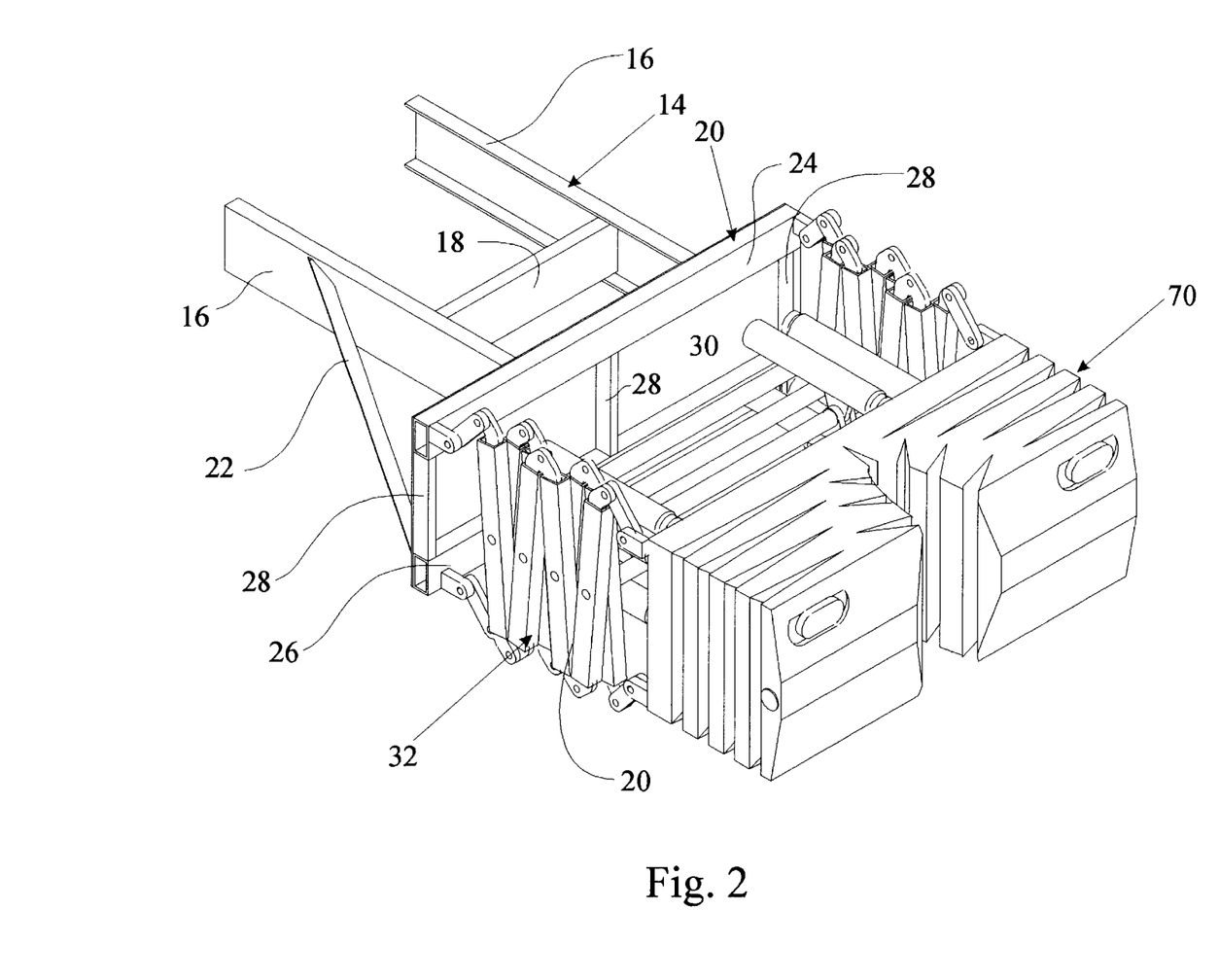
FIG. 2 shows an enlarged view of the first embodiment of the crash attenuator in accordance with the invention in its contracted condition.
Figure 3:
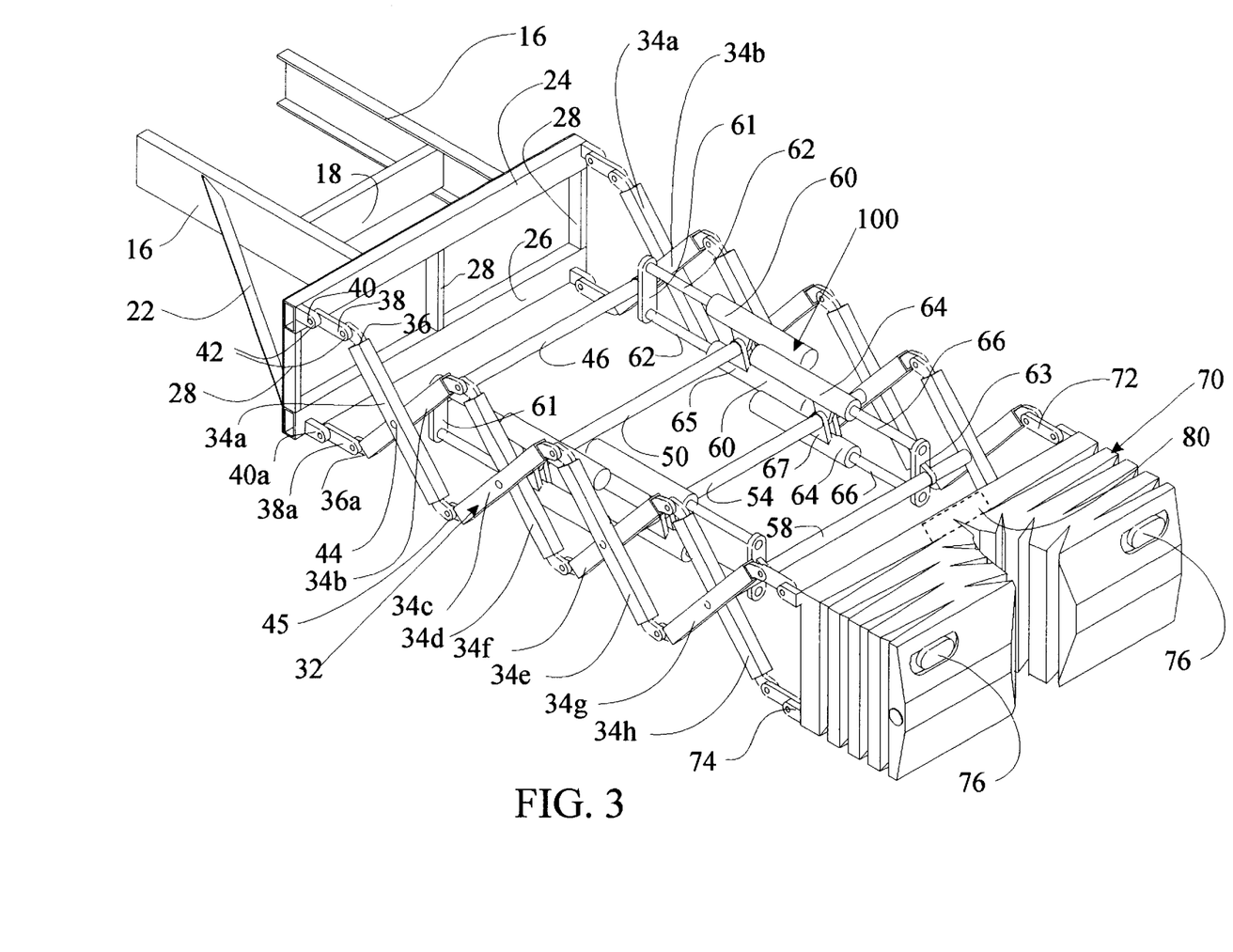
FIG. 3 shows the first embodiment of the crash attenuator in accordance with the invention in its expanded condition.

FIGS. 1 and 2 show the crash attenuator 10 in its compressed or contracted condition or position that is also the storage and transport position and is as small as 25% of the length of the crash attenuator in its expanded condition or position. Generally, the length of the crash attenuator 10 in its contracted state can be 50% or less of the length in its expanded state. To enable the expansion or extension of the crash attenuator 10, the crash attenuator 10 includes a movable displacement structure such as a scissors mechanism 32 which comprises a plurality of elongate members 34a–34h on each side of the crash attenuator 10 (FIG. 3). Elongate members 34 are substantially rigid and have a rectangular body section and projecting links 36 at each end. Member 34a is connected via its link 36 at its upper end to a link 38 which in turn is connected to a link 40 fixedly mounted on the upper horizontal beam 24 of the beam structure 20. The connection between the links 36,38,40 is designed so that each link is rotatable relative to each of the links connected therewith, e.g., through a pin 42 extending through each pair of connected links and defining a pivot axis. As such, link 36 and thus member 34a can rotate relative to link 38 and link 38 is also rotatable relative to link 40 so that as a result, the lower end of member 34a is swingable outward away from the beam structure 20 by virtue of the rotation of the link 36 at the upper end of member 34a relative to the link 38 which in turn is rotatable relative to the link 40. In a similar manner, member 34b is movably coupled to the lower horizontal beam 26 via links 36a,38a,40a so that the upper end of member 34b is swingable outward away from the beam structure 20. A pin 44 is arranged at the center point of the members 34a,34b to connect the same while enabling rotation of both members 34a,34b, i.e., both members are rotatable about the axis defined by the pin 44.

Member 34c is connected to member 34a via the links 36 at the lower end of each member whereby a pin 45 extends through the links to enable rotation of both members 34a, 34c about the axis defined by the pin. Member 34e is connected to member 34c via the links 36 at the upper end of each member whereby a pin extends through the links to enable rotation of both members 34c,34e about the axis defined by the pin. Member 34e is connected to member 34g via the links 36 at the lower end of each member whereby a pin extends through the links to enable rotation of both members 34e,34g about the axis defined by the pin.

Member 34b is connected to member 34d via the links 36 at the upper end of each member whereby a pin extends through the links to enable rotation of both members 34b, 34d about the axis defined by the pin. Member 34f is connected to member 34d via the links 36 at the lower end of each member whereby a pin extends through the links to enable rotation of both members 34d,34f about the axis defined by the pin. Member 34h is connected to member 34f via the links 36 at the upper end of each member whereby a pin extends through the links to enable rotation of both members 34f,34h about the axis defined by the pin.

Figure 4:
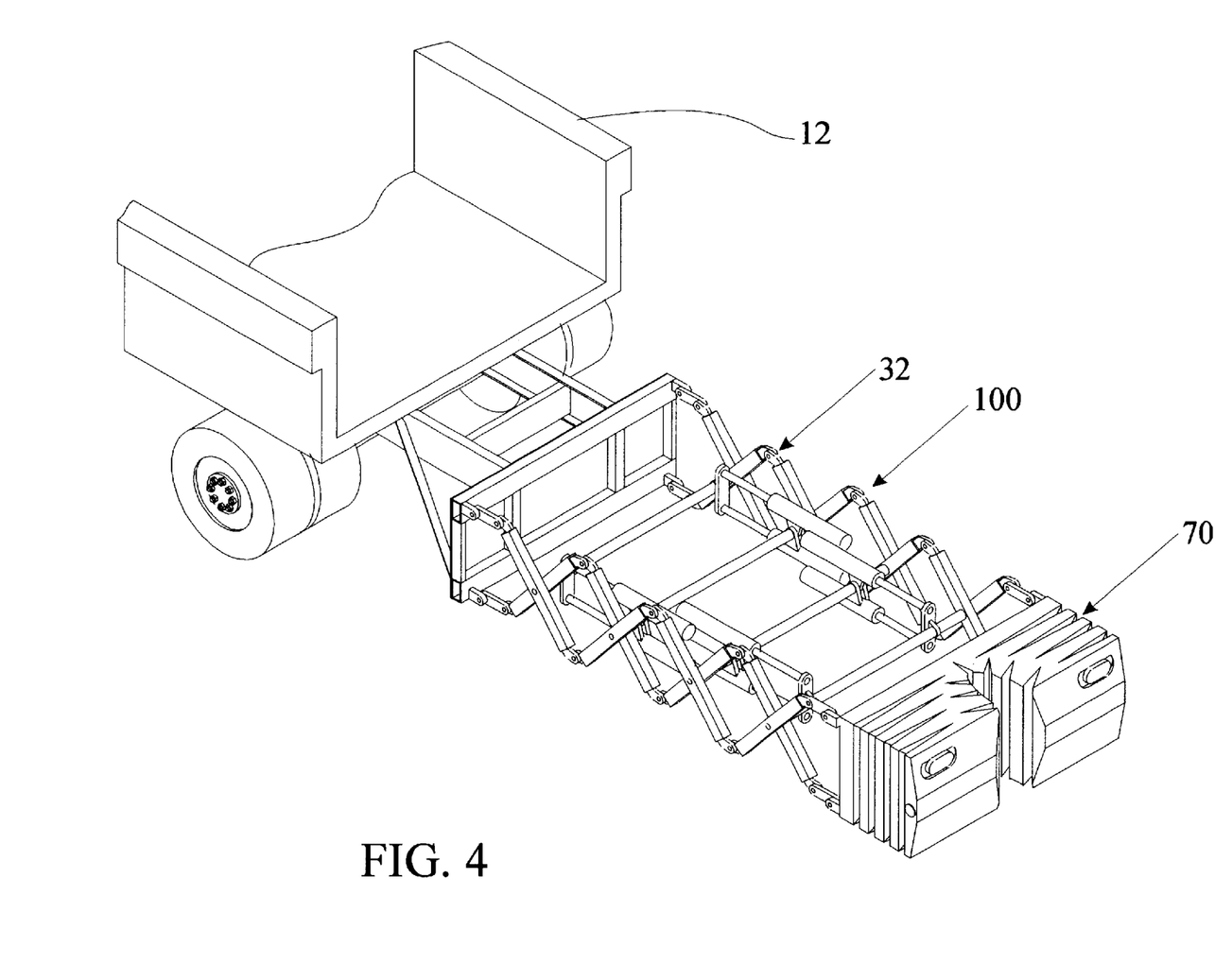
FIG. 4 shows another view of the first embodiment of the crash attenuator in accordance with the invention in its expanded condition.

Overall, by means of the links 36 and pins connecting adjoining links 36, the scissors mechanism 32 is movable between the contracted position shown in FIGS. 1 and 2 and the expanded position shown in FIGS. 3 and 4. The scissors mechanism 32 should be sufficiently rigid and sturdy to maintain a bumper 70 arranged at the end of the scissors mechanism 32 at a desired level from the ground without excessive sag. Note that in general permanently lubricated journal bearings are used at each rotation joint which is the convention in the art. Naturally, other types of bearings such as ball or roller bearings can also be used.

Bumper 70 as shown in FIG. 1 is a flat plate. In FIGS. 2–5, the bumper 70 is shown as a rather, large bumper, additional details of the construction of which are provided below.

In the embodiment shown in FIGS. 1–4, a support structure is included for supporting a hydraulic system which facilitates the expansion and contraction of the attenuator 10 and also enables the controlled contraction of the attenuator after a crash to enable the attenuator to be responsive to the kinetic energy of the impacting vehicle, i.e., provide a variable resistive or energy dissipation force depending on the mass and velocity of the impacting vehicle.

To this end, pin 44 is formed integral with or connected to a transverse rod 46 that extends from one side of the crash attenuator 10 to the other side. At the other side of the crash attenuator 10, the rod 46 is connected to or formed integral with the pin connecting the corresponding members 34a,34b at that side. A pin 48 is also arranged at the center point of the members 34c,34d to connect the same while enabling rotation of both members 34c,34d, i.e., both members are rotatable about the axis defined by the pin 48. Pin 48 is formed integral with or connected to a transverse rod 50 that extends from one side of the crash attenuator 10 to the other side. At the other side of the crash attenuator 10, the rod 50 is connected to or formed integral with the pin connecting the corresponding members 34c,34d at that side. A pin 52 is also arranged at the center point of the members 34e,34f to connect the same while enabling rotation of both members 34e,34f, i.e., both members are rotatable about the axis defined by the pin 52. Pin 52 is formed integral with or connected to a transverse rod 54 that extends from one side of the crash attenuator 10 to the other side. At the other side of the crash attenuator 10, the rod 54 is connected to or formed integral with the pin connecting the corresponding members 34e,34f at that side. Similarly, a pin 56 is arranged at the center point of the members 34g,34h to connect the same while enabling rotation of both members 34g,34h, i.e., both members are rotatable about the axis defined by the pin 56. Pin 56 is formed integral with or connected to a transverse rod 58 that extends from one side of the crash attenuator 10 to the other side. At the other side of the crash attenuator 10, the rod 58 is connected to or formed integral with the pin connecting the corresponding members 34g,34h at that side.

Rods 46,50,54,58 thus constitute a support structure for the energy dissipation system described below. Other support arrangements are of course encompassed within the invention without deviating from the scope and spirit thereof Rods 46,50,54,58 are shown as being elongate and substantially cylindrical. However, it is pointed out that the rods 46,50,54,58 may be any shape whatsoever and further, that not all of the rods are required, i.e., it is possible to dispense with one or more of the rods connecting the pins on opposite sides of the crash attenuator 10. Also, each of the transverse rods may be formed integral with the associated pins.

In the embodiment shown in FIGS. 1–4, the energy dissipation system is a hydraulic actuating mechanism 100 arranged in connection with the scissors mechanism 32 and which serves to expand and contract the same. Hydraulic actuating mechanism 100 is designed to provide an energy dissipation force to dissipate at least some, if not all, of the energy of the vehicle impacting the bumper by controlling the contraction or compression of the scissors mechanism 32, i.e., the movement of the scissors mechanism 32 from its expanded condition shown in FIGS. 1 and 2 toward its contracted condition shown in FIGS. 3 and 4. The energy dissipation force is ideally adjustable and determined, e.g., based on the kinetic energy of the impacting vehicle.

To mount the hydraulic actuating mechanism 100, at each side of the crash attenuator 10, a mounting plate 61 is attached to the transverse rod 46 and a mounting plate 63 is attached to transverse rod 58. Mounting plates 61,63 may be formed with a projecting part having an aperture designed to receive the respective rod 46,58. A pair of actuators 60 are coupled to the mounting plate 61 and via rigid mounting links 65 to transverse rod 50. Similarly, a pair of actuators 64 are coupled to mounting plate 63 and via rigid mounting links 67 to transverse rod 54. Mounting links 65,67 include an aperture designed to receive the respective transverse rod 50,54. Each actuator 60,64 includes a cylinder having a hollow interior, a piston rod which is movable within the interior of the cylinder and means for passing a fluid into the hollow interior into a space between a head of the piston rod and an end of the cylinder so as to cause the piston to move outward from the cylinder when the fluid is passed into the space and to move back into the cylinder when the fluid is removed from the space. The construction of the cylinders is conventional. Actuators 60 each have a piston rod 62 that is connected to the mounting plate 61, whereas the cylinder itself is connected to mounting links 65. In a like manner, actuators 64 each have a piston rod 66 which is connected to the mounting plate 63, whereas the cylinder itself is connected to mounting links 67.

The actuators 60,64 are positioned so as not to interfere with the transverse rods 46,50,54,58 when the scissors mechanism 32 is in its contracted position. Thus, as shown in FIGS. 3 and 4, the actuators 60,64 are situated above and below the transverse rods 46,50,54,58 that are essentially in the same horizontal plane. Also, by virtue of the connections of the cylinders of the actuators 60,64 to the transverse rods 50,54 and the connection of the piston rods 62,66 to the mounting plates 61,63, which are connected to the transverse rods 46,58, the transverse rods 54,58 are movable relative to each other upon actuation of the actuators 64 and the transverse rods 46,50 are movable relative to each other upon actuation of the actuators 60.

In operation, the piston rods 62,66 start out housed within the respective cylinder 60,64 as shown in FIGS. 1 and 2. Thereafter, when it is desired to expand the scissors mechanism 32, a hydraulic medium is directed into the actuators 60,64 to force the respective piston rod 62,66 out of the interior of the cylinder. In this manner, the transverse rods 46,50,54,58 are moved apart from one another which causes the members 34a–34h to be forced into the expanded position shown in FIGS. 3 and 4 in view of the connection between the transverse rods 46,50,54,58 and the members 34a–34h via the pins connecting the center regions of crossing members.

Note that the hydraulic hoses and reservoirs have not been shown in the drawings in order to permit the concepts to be more easily understood.

Although a scissors mechanism has been illustrated for the supporting structure in the above-described embodiment, other linkage designs would also work for some applications without deviating from the scope and spirit of the invention. Thus, instead of the scissors mechanism described above, other collapsible structures composed of a plurality of members arranged to provide the collapsible structure with a contracted position and an expanded position may be used. Such structures could include members linked and articulated to one another. One such design uses a bifold door type structure, using hinged vertical frames, and another is based on 4-bar linkages. Although a vertical scissors structure has been illustrated employing two such structures, in some applications as many as four or more such mechanisms are used. Similarly, although the scissors are shown lying in a vertical plane, they can be combined with scissors mechanisms that are on top and bottom of the device, or, alternately, only horizontal scissors mechanisms are used with appropriate vertical bracing. Even with the illustrated design, many types of cross bracing can be added as needed.

A variety of added supporting structures or apparatus could be used including wheels and cables. The system may even be designed to deflect downward when impacted so as to obtain some support from the ground. This would also add a certain amount of lateral stability to the system.

The crash attenuator 10 also comprises a bumper 70 mounted via links 72 to the upper link 36 of members 34g and via links 74 to the lower link 36 of members 34h. Bumper 70 is made from a material that can provide a low level of energy absorption for low speed impacts, such as polyurethane foam. The extreme rear end of the bumper 70 may include reflectors 76. Bumper 70 may also be made of fibrous hexagonal elongate cells, or a series of chambers made from sheet material, or any other known construction for providing energy absorption.

To provide the damping of the crash attenuator 10 during a crash, the hydraulic actuating mechanism 100 includes control means associated with the actuators 60,64 for controlling the release of fluid therefrom, the release of fluid from the actuators 60,64 determining the movement of the piston rod 62,66 back into the respective cylinder and thus the energy dissipation force effective to decelerate the vehicle. Initially, in the expanded condition, the actuators 60,64 include enough fluid to provide for the desired length of the attenuator 10, and thus in a crash, some of this fluid will be released. The hydraulic actuating mechanism 100 may comprise a valve having a variable opening or variable size orifice through which the fluid from the actuators 60,64 flows. An electronic control module 80 is arranged at the rear of the bumper 70 to detect the deceleration of the vehicle and is coupled to control means for the valve. Accordingly, the orifice of the valve has an initial size that will result in a predetermined outflow of fluid from the actuators 60,64 and thus a predetermined energy dissipation force to the impacting vehicle. If the electronic control module 80 determines that the deceleration of the vehicle is too rapid or too slow, it adjusts the size of the orifice to obtain a desired deceleration rate of the vehicle. As such, by adjusting the size of the orifice, the attenuator 10 provides a substantially constant deceleration rate of all vehicles regardless of their mass and velocity. Alternately, once the mass and velocity of the impacting vehicle has been determined, the control module 80 can adjust the deceleration of the impacting vehicle so as to use up nearly all of the stroke of the TMA. In this manner, injury to the vehicle occupants, damage to the impacting vehicle and risk of airbag deployment is minimized especially for low velocity crashes.

Figure 5:
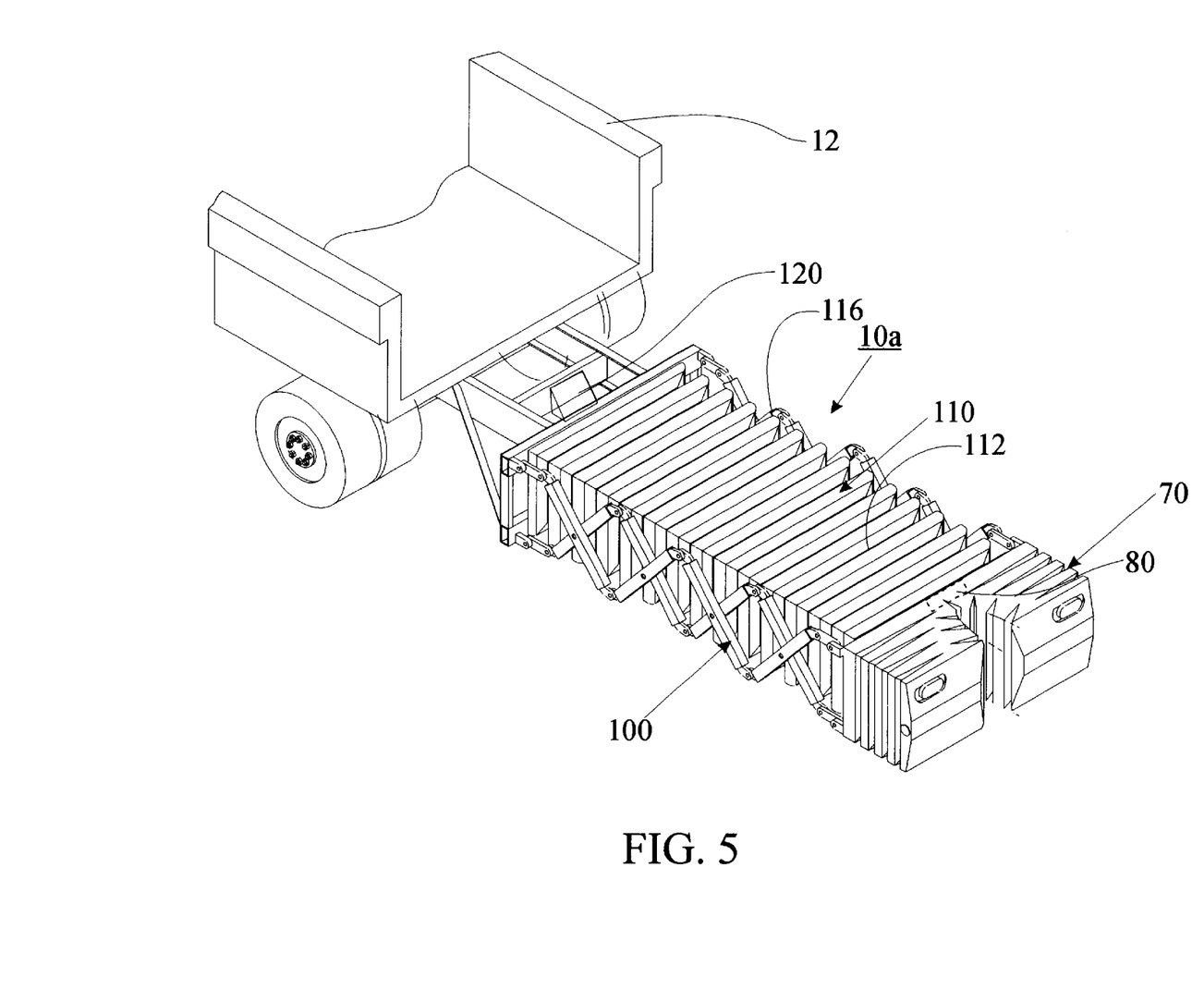
FIG. 5 shows a second embodiment of a crash attenuator in accordance with the invention in its expanded condition.

FIG. 5 shows a pneumatic system 110 for providing an energy dissipation force for dissipating the energy from the impact of the vehicle into the attenuator 10A. The pneumatic system 110 comprises one or more inflatable airbags 112 defined by a material 114, and if a plurality of such compartments is provided, then the compartments may be fluidly separated from one another or coupled to one another. The scissors mechanism 100 is essentially the same as that described above with respect to FIGS. 1–4, except that the transverse rods 46,50,54,58 are not provided since it is not necessary to couple actuators to the same. Rather, the links 36 at the ends of each member 34a–34h are mounted to intermediate supports 116 and the material 114. Tethers 118 may also be provided to maintain a desired shape of the airbags 112.

The airbag 112 is closed and to this end, has a face at one end adjoining the plate 30 of the beam structure 20 connected to the truck 12 and a face at an opposite end connected to the bumper 70. A pneumatic device 120 is arranged on the frame 14 and has an outlet into the airbag 112. To initially expand the airbag 112, the pump is activated to direct air or another medium into the airbag 112. The outlet from the pneumatic device 120 has a variable size and the pneumatic device 120 is also designed to allow outflow of air from the airbag 112.

In a crash, the airbag 112 will experience a controlled deflation thereby providing a desired deceleration to a vehicle impacting the attenuator 10A regardless of that vehicle's mass and velocity. To this end, the electronic control module 80 is arranged on the rear of the bumper 70 and senses deceleration of the vehicle, as conveyed through the bumper 70. The outlet of the pneumatic device 120 has an initial size which allows air to be expelled from the airbag 112 reducing the pressure in the airbag 112 yet still enabling the airbag 112 to provide a energy dissipation force to the impacting vehicle and decelerate the same. If the deceleration rate of the vehicle is too high or too low, i.e., beyond safe ranges, as detected by the electronic control module 80, then the electronic control module 80 causes an adjustment in the size of the outlet of the pneumatic device 120, i.e., increases or decreases the same. In this manner, the airbag will deflate at a controlled rate, or more appropriately maintain a specific pressure in order to decelerate the impacting vehicle at the desired rate.

The airbag 112 may be made with tethers 118 alone to provide its shape in its expanded condition, without any intermediate supports.

Figure 7:
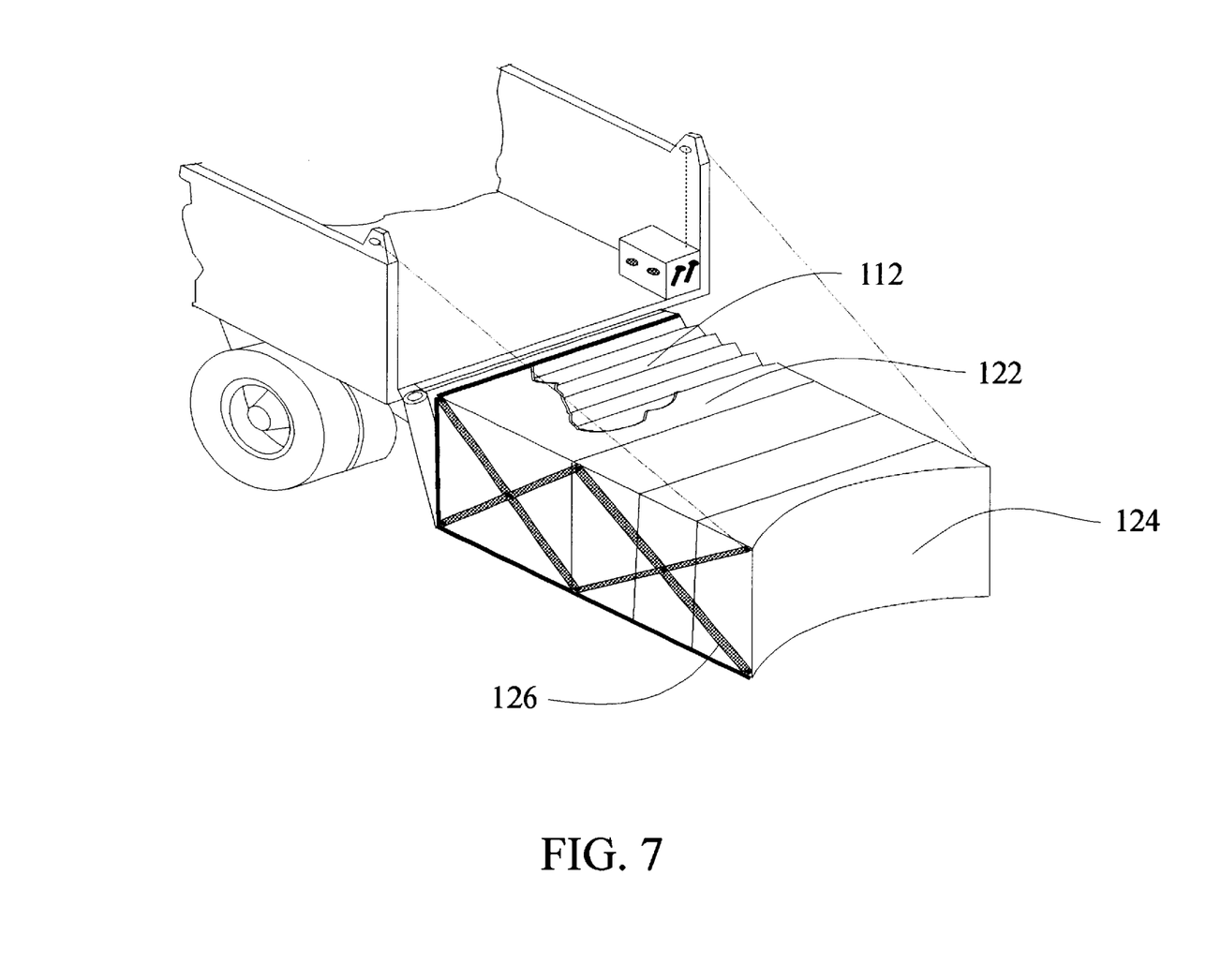
FIG. 7 shows a modified embodiment of the crash attenuator in accordance with the invention having an accordian design for the airbag.

As shown in FIG. 7, the airbag 112 may be encased within an accordian like housing 122 which thus serves to provide the shape of the airbag 112. In this embodiment, the scissors mechanism 126 only comprises two expanding sections and a bumper 124 having a concave face for directing the vehicle into the center of the crash attenuator.

Energy Absorption

Figure 6:
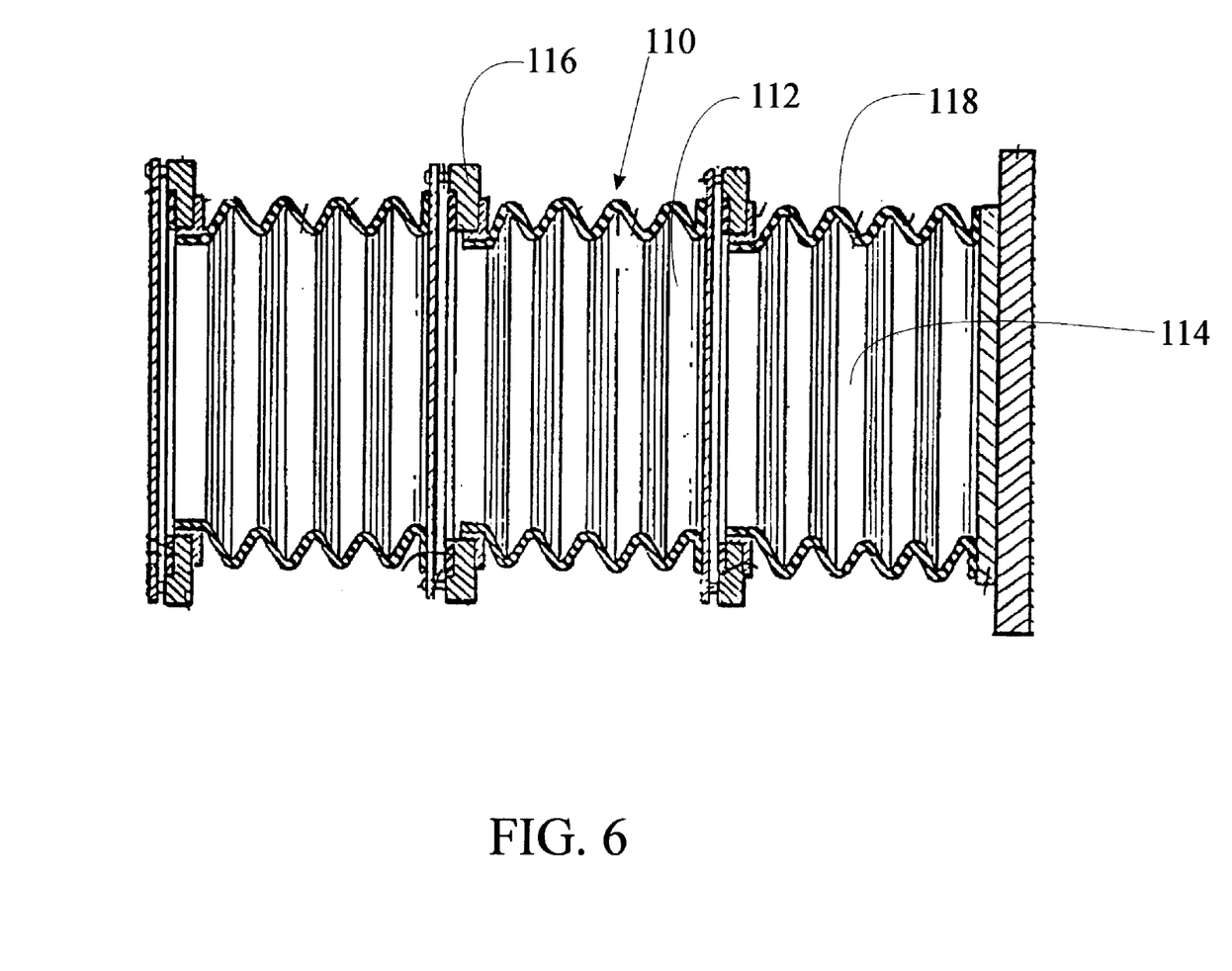
FIG. 6 shows the airbag used in the second embodiment of the crash attenuator in accordance with the invention.

Although the hydraulic system shown in FIGS. 1–4 is preferred, the pneumatic system shown in FIGS. 5–7 has some advantages especially where space is not as limited. A large airbag that can be injected with additional gas just prior to an impact, possibly in response to the anticipatory sensing of a vehicle about to impact the attenuator, also partially solves the loss of space problem which occurs due to the compressibility of air during impact. Alternately, a sacrificial plastically deformable metal structure can be provided to compensate for the compression of the air during the initial stages of the impact. The design of such structures is known in the art but their use in this manner is unique.

Both the hydraulic and the pneumatic systems can be affected by the mass of the TMA structure. This may or may not be an advantage and in some cases it is desirable to add additional mass which must be accelerated by the impacting vehicle as part of the system. The crush characteristics of the impacting vehicle should also be taken into account in the design of the TMA The vehicle crush has the effect of giving a lower deceleration during the initial portion of the impact and a higher deceleration in the later portion when the vehicle is subjected to a constant force. This should be compensated for in the TMA algorithm since the sensing system 80 measures the deceleration of the front of the impacting vehicle rather than, as desired, its center of gravity.

Interception of impacting vehicle

Current TMAs make little provision for effecting the trajectory of the impacting vehicle. This is important since it is not desirable to deflect the vehicle off of the TMA if this can be avoided. Such a deflection could result in further accidents by allowing the impacting vehicle to leave the road and impact a tree, for example, or direct it into the path of oncoming traffic. When possible, therefore, the impacting vehicle should be captured by the TMA.

In accordance with the invention, means for guiding the path or trajectory of the object after impact into the bumper may be provided. For example, this can be done to some extent through the design of the TMA where the sides of the bumper 70 are made stiffer than the center. As shown in FIGS. 2–5, this is achieved by forming a recessed area 78 in the center region of the bumper 70 facing the impacting vehicle. In the alternative, in some cases it is desirable to provide wing-like structures, which extend laterally beyond the TMA, to further guide the vehicle into the center of the TMA.

Additionally, some local structure associated with the end of the TMA that is impacted can be designed to grab the impacting vehicle to prevent it from sliding off of the face of the TMA. One example of such a structure is shown in FIG. 7 wherein the bumper 124 is concave.

An alternate solution is to permit local plastic deformation of the face of the TMA so that it conforms to the surface of the impacting vehicle to oppose sliding of the vehicle off of the TMA face. This will result in some permanent "damage" to the TMA face. In this case, the face should be made as a replaceable part.

Electronics & Functional

The TMA is designed to provide a constant deceleration to any object that impacts it. This design deceleration is a particular value that is chosen to minimize injuries to vehicle occupants. A potential problem exists in that the deceleration must also be sufficient to trigger deployment of the airbags within the vehicle. This poses a problem since the airbag crash sensor algorithms are generally considered proprietary and therefore are unknown to the TMA designer. The TMA designer must be careful that an optimum design of one safety system does not defeat another safety system and thereby result in more injury than would otherwise occur.

Basically, if the TMA is designed to provide a constant deceleration of typically 15 Gs, for example, the force exerted onto the vehicle by the TMA should be proportional to the mass of the impacting vehicle regardless of its impacting velocity. Since the mass of possible impacting vehicles varies by a factor of three or more, the TMA must be capable of supplying forces having a similar variation in magnitude. This is accomplished by having sensors that are capable of sensing the deceleration of the impacting vehicle as described above. Sensor technologies which are capable of this function include mechanical seismic devices, radar, accelerometers, string potentiometers, laser optical ranging sensors (lidar), ultrasonic ranging sensors, and mechanical probes, among others. Although the preferred embodiment uses sensors that sense the deceleration of the impacting vehicle, or the face of the TMA which is assumed to approximately represent the impacting vehicle, anticipatory sensing using a neural network derived algorithm can also be used beneficially. In all cases, in the instant invention the sensors provide information to the control module which adjusts the opening of the airbag valve or the hydraulic cylinder orifices (the flow restrictors) to adjust the force of the TMA face against the vehicle to achieve the desired constant deceleration.

It is believed that the invention disclosed herein is the first adaptive crash attenuator system. Namely, it is believed that it is the first system to vary the force of the impactor against the impacting vehicle in response to the vehicle deceleration. It is the first electronic system applied to impactors. It is also the first adjustable or adaptive impact attenuator system.

Restrictor

The restrictor which is used to control the flow of the fluid from the airbag(s) (pneumatic embodiment shown in FIGS. 5–7) or the fluid from the actuators 60,64 (hydraulic embodiment shown in FIGS. 1–4) is an important part of this invention. The size of the restrictor opening, along with the pressure when the chamber, determines the flow of the fluid out of the airbag(s) or hydraulic cylinders. This in turn determines the force that the TMA applies to the impacting vehicle and thus the deceleration of the impacting vehicle. The size of the restrictor opening is determined by an actuator and associated Electronic Control Unit (ECU) 80 that contains a microcomputer and associated algorithm. In operation, accelerometers coupled to the ECU 80 first determine that the impact-receiving face of the TMA is being impacted as the face initially achieves the velocity of the impacting vehicle. The TMA's impact-receiving face, and the impacting vehicle, then begin decelerating at substantially the same rate, which deceleration is measured by the accelerometers or other types of sensors as described above. The accelerometer or other sensor signal(s) is/are fed into the ECU, which determines the rate of deceleration of the face and vehicle. If this rate is above the predetermined value, the restrictor is opened allowing more fluid to flow out which reduces the pressure in the chamber (hydraulic cylinder or airbag) and thus reduces the resistive force of the TMA repelling or opposing the movement of the impacting vehicle. If the deceleration is too great, that fact is determined by the ECU and the restrictor opening is made smaller to reduce the outflow of fluid from the chamber in the hydraulic actuators 60,64 (FIGS. 1–4) or airbag(s) 112 (FIGS. 5–7). In this manner, the deceleration of the TMA face and thus the impacting vehicle is controlled to the prescribed, predetermined value.

The algorithm in the ECU includes corrections for the mass and thus the dynamics of the truck on which the TMA is mounted as well as, to the extent possible, for the crush of the impacting vehicle. In some implementations when multiple accelerometers or other sensors are present permitting a measurement of the rotation of the vehicles, that fact can also be taken into account m the algorithm and used to more accurately adjust the restrictors to attempt to reduce the vehicle rotation.

Pressurization (pneumatic case)

For the pneumatic case shown in FIGS. 5–7, the airbag(s) 112 is/are expanded when the truck arrives at the work site using a pump or other pneumatic pressurizing device 120 such as a vacuum cleaner type pump or a small turbine. If desired, the pump can increase the airbag pressure to a value above atmospheric pressure thereby reducing the compressibility effects described above. Additionally, if an anticipatory crash sensor such as a radar or lidar system is used, or another sensor or sensor system (which may be based on pattern recognition techniques) which will detect the impending impact of a vehicle into the attenuator 10A, a pyrotechnic inflator can also be employed which will substantially increase the pressure in the airbag immediately prior to the impact in much the same manner as interior airbag inflators supply gas to a driver or passenger airbag during a crash. Instead of a pyrotechnic inflator, other available inflators can also be used. The pressure in the airbag should be about 15 psi, which may be achieved by using a pump, a compressor, a turbine and/or by heating a gas using an inflator after impact has been predicted by, for example, an anticipatory sensor, or after the impact has started (the impact has been detected).

Applications

The primary application for the TMA of this invention is for mounting onto movable platforms such as trucks to provide protection for highway work crews. Naturally, the teachings are also applicable to fixed installations especially where there is limited available space. This invention is the first "smart" crash attenuator which adjusts the restraining force automatically in response to the kinetic energy of the impacting vehicle or object. The application of such sensing systems to other safety barriers will now be possible and, thus, the invention disclosed here is not limited to crash attenuators. In particular, in many cases there is insufficient space to deploy even the attenuators described herein in their expanded state and thus anticipatory sensing, i.e., sensing an impending impact of a vehicle into the attenuator, coupled with pyrotechnic inflators may be used to permit an airbag crash attenuator to be deployed in anticipation of a crash to cushion an impacting vehicle. This is the first use of an airbag mounted on a fixed structure which inflates to cushion the impact of a vehicle. Alternatively, in the hydraulic embodiment shown in FIGS. 1–4, the hydraulic cylinders 60,64 may be actuated to extend the scissors mechanism upon a determination of an impending crash by an anticipatory sensor system.

Such a device will find wide application along with the development of smart highways where vehicles are automatically guided at high speeds. On such highways, a vehicle may suffer a catastrophic failure and go out of control. An anticipatory sensor with a deployable crash attenuator would then cushion the impact of the troubled vehicle. For the cases of anticipatory sensors, a neural network based algorithm such as disclosed in U.S. patent application Ser. No. 08/247,760 may be used.

Other Advantages

A key advantage of the attenuators of this invention is that they are for the most part collapsible to a length substantially shorter than their expanded or deployed length. In some cases, the collapsed length is less than about 25% of the expanded length. This permits the attenuator to be easily stored, shipped and transported to the work site. To decrease their length, current TMAs are rotated into a vertical position during transportation to the work site. This not only requires expensive hydraulic apparatus to be mounted onto the vehicle to provide the power to rotate the TMA to and from the vertical position but it also limits the length of the TMA and thus the degree of protection afforded by the device.

The attenuator of the present invention also has a relatively lighter weight than current attenuators of comparable capacity. This is a result of the structural optimization in the design of this invention.

Finally, providing the attenuator is impacted within its design capabilities, the device can be reused shortly after an impact.

Although several preferred embodiments are illustrated and described above, there are possible combinations using other geometries, sensors, materials and different dimensions for the components that perform the same functions. This invention is not limited to the above embodiments and should be determined by the following claims.

It will be understood that numerous modifications and substitution can be made to the above-described embodiments without deviating from the scope and spirit of the invention. Accordingly, the above-described embodiments are intended for the purpose of illustration and not as limitation.

The preferred embodiments of the invention are described above and unless specifically noted, it is the applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" here is not intended to indicate that the applicant seeks to invoke the special provisions of 35 U.S.C. §112, sixth paragraph, to define their invention. To the contrary, if applicant wishes to invoke the provisions of 35 U.S.C.§112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

Appendix 1

Analysis of Air-Damped Truck Mounted Attenuator (AD-TMA)

The AD-TMA in accordance with the invention s a buffer that is positioned behind a highway truck to absorb some or all of the energy of an impacting vehicle. In certain embodiments, the buffer is a substantially rectangular airbag that is designed to bring the speed of the impactor (which is most likely an impacting vehicle) to the speed of the highway truck by the time the airbag is fully collapsed. Initially, the highway truck is at rest with the transmission in gear and the brake set. After impact, the energy absorption occurs in 4 stages: in the first stage, the truck remains stationary and the pressure in the buffer increases as the buffer shortens. At the end of the first stage, the pressure in the buffer is high enough that the force the buffer exerts on the truck overcomes the friction between the truck tires and the road, and the truck begins to slide forward. During the second stage, the buffer continues to shorten, its pressure continues to build, and the impactor and truck are both moving. At the end of the second stage, the pressure reaches its maximum value. The third stage is similar to the second except that a vent valve opens to allow air to flow out of the buffer at a rate such that the pressure remains constant. At the end of the third stage, the buffer is completely collapsed and the impactor and truck are moving at the same speed. In the fourth stage, the impactor and truck move together and both come to rest due to the friction between the truck tires and the road.

For the analysis the following parameters are introduced:

$W_T$=weight of highway truck,
W=weight of impactor,
x=displacement of impactor after the impact,
$x_T$=displacement of highway truck after impact,
L=initial (uncompressed) length of buffer,
A=cross-section area of buffer (remains constant),
V=volume of buffer=$A(L-x+x_T)$,
p=absolute pressure in the buffer,
  $p_a$=initial (atmospheric) pressure,
  $p_1$=pressure at end of stage 1,
  $p_2$=pressure at end of stage 2 (maximum),
$\mu$=coefficient of friction between truck tires and road,
$\gamma$=ratio of specific heats of air.

Equations

In Stages 1, 2, and 3

$$\frac{W}{g}\ddot{x} = -A(p - p_a), \quad (1)$$

In Stage 1 $x_T$=0, In Stages 2 and 3

$$\frac{W_T}{g}\ddot{x}_T = A(p - p_a) - \mu W_T, \quad (2), (3)$$

In Stages 1 and 2

$$p = p_a\left(\frac{L}{L - x + x_T}\right)^\gamma, \quad (4), (5)$$

In Stage 3 $p=p_2$,

Initially $x=x_T$=0, $\dot{x}=\dot{x}_0$, $\dot{x}_T$=0. (6)

At the end of Stage 1 $A(p_1-p_a)=\mu W_T$. (7)

At the end of Stage 3 $x-x_T$=L, dx/dt=$dx_T$/dt. (8)

Stage 1

Equation (7) yields $$p_1 = p_a\left(1 + \frac{\mu W_T}{p_a A}\right), \tag{9}$$

and then (4) and (2) give $$\frac{x_1}{L} = 1 - \left(1 + \frac{\mu W_T}{p_a A}\right)^{-1/\gamma} \tag{10}$$

Equation (1) with (4) and (2) can be integrated and then Equation (9) used to get $$\dot{x}_1^2 = \dot{x}_0^2 - \left(\frac{2g}{W}\right)\left(\frac{\mu W_T(L - x_1) - \gamma A p_a x_1}{\gamma - 1}\right). \tag{11}$$

Stage 2

Equations (1), (3), and (4) can be combined and integrated to yield $$(\dot{x}_2 - \dot{x}_{T2})^2 = \dot{x}_1^2 - 2gA\left(\frac{1}{W} + \frac{1}{W_T}\right)\left[\left(\frac{p_2}{\gamma - 1} + p_a\right)(L - x_2 + x_{T2}) - \right. \tag{12}$$

$$\left. \left(\frac{p_1}{\gamma - 1} + p_a\right)(L - x_1)\right] + 2\mu g[(L - x_1) - (L - x_2 + x_{T2})]$$

and Equation (4) gives $$p_2 = p_a\left(\frac{L - x_2 + x_{T2}}{L}\right)^{-\gamma} \tag{13}$$

Stage 3

Here $$(\ddot{x} - \ddot{x}_T) = -gA\left(\frac{1}{W} + \frac{1}{W_T}\right)(p_2 - p_a) + \mu g = \text{constant.}$$

This can be integrated twice and conditions (8) used to get $$(\dot{x}_2 - \dot{x}_{T2})^2 = \left[2gA\left(\frac{1}{W} + \frac{1}{W_T}\right)(p_2 - p_a) - 2\mu g\right](L - x_2 + x_{T2}) \tag{14}$$

and when this is combined with Equations (12) and (13), $$\frac{\gamma}{\gamma - 1}\left(\frac{1}{W} + \frac{1}{W_T}\right)p_a A L\left(\frac{L - x_2 + x_{T2}}{L}\right)^{-(\gamma - 1)} = \tag{15}$$

$$\frac{\dot{x}_1^2}{2g} + A\left(\frac{1}{W} + \frac{1}{W_T}\right)\left(\frac{p_1}{\gamma - 1} + p_a\right)(L - x_1) + \mu(L - x_1)$$

Also, $$\dot{x} - \dot{x}_T = (\dot{x}_2 - \dot{x}_{T2})\sqrt{\frac{L - x + x_T}{L - x_2 + x_{T2}}} \tag{16}$$

during Stage 3.

Now when $W$, $W_T$, $A$, $L$, $\dot{x}_0$, $\mu$, $\gamma$, $p_a$, and $g$ are given, $x_1$, $p_1$, $\dot{x}_1$, , $x_2 - x_{T2}$, $p_2$, and $\dot{x}_2 - \dot{x}_{T2}$ can be calculated.

The final step is to calculate the orifice size needed to maintain constant pressure during Stage 3. First, assuming adiabatic conditions (no heat transfer), during this Stage, if m is the mass of air in the buffer, $C_v$ and $C_p$ are the constant volume and constant pressure specific heats, and T and V are the air temperature and volume in the buffer, then $d(mC_vT) = -pdV + C_pTdm$. But since $p = p_2$ is constant, $pdV = d(p_2V) = d(mRT)$ and $C_p - C_v = R$, where R is the gas constant, this becomes $d(mC_pT) = C_pTdm$ which shows that T also is constant, $T = T_2$ during Stage 3. With constant temperature and pressure the air density also will remain constant, $\rho = \rho_2$.

$$T_2 = T_a\left(\frac{L}{L - x_2 + x_{T2}}\right)^{\gamma - 1} \tag{17}$$

Then using the standard orifice equations, $$-\dot{m} = C_D A_o \rho_2\left(\frac{p_a}{p_2}\right)^{\frac{1}{\gamma}}\sqrt{2C_pT_2\left[1 - \left(\frac{p_a}{p_2}\right)^{\frac{\gamma-1}{\gamma}}\right]} \text{ if } \frac{p_2}{p_a} \leq \left(\frac{\gamma + 1}{2}\right)^{\frac{\gamma}{\gamma-1}} \tag{18}$$

or $$-\dot{m} = C_D A_o \rho_2\left(\frac{2}{\gamma + 1}\right)^{\frac{1}{2}\left(\frac{\gamma+1}{\gamma-1}\right)}\sqrt{\gamma R T_2} \text{ if } \frac{p_2}{p_a} \geq \left(\frac{\gamma + 1}{2}\right)^{\frac{\gamma}{\gamma-1}}. \tag{19}$$

Using $-\dot{m} = -\rho_2\dot{V} = \rho_2 A(\dot{x} - \dot{x}_T)$ and the formulas above to get $\dot{x} - \dot{x}_T$ the orifice area $A_o$ can be calculated for any $x - x_T$. Here $C_D$ is the orifice coefficient, typically about 0.6. If Equation (18) holds, then $$A_o = \left(\frac{\gamma + 1}{2}\right)^{\frac{1}{2}\left(\frac{\gamma+1}{\gamma-1}\right)}\frac{A(\dot{x} - \dot{x}_T)}{C_D\sqrt{\gamma R T_2}} = \tag{20}$$

$$\left(\frac{\gamma + 1}{2}\right)^{\frac{1}{2}\left(\frac{\gamma+1}{\gamma-1}\right)}\frac{A(\dot{x}_2 - \dot{x}_{T2})}{C_D\sqrt{\gamma R T_2}}\sqrt{\frac{L - x + x_T}{L - x_2 + x_{T2}}}$$

Motion of Truck

Equations (1) and (3) show that the increment in system kinetic energy is $$d\left(\frac{W}{g}\frac{\dot{x}^2}{2} + \frac{W_T}{g}\frac{\dot{x}_T^2}{2}\right) = \frac{W}{g}\ddot{x}dx + \frac{W_T}{g}\ddot{x}_T dx_T$$

$$= -A(p - p_a)d(x - x_T) - \mu W_T dx_T$$

$$= (p - p_a)dV - \mu W_T dx_T$$

$$= -d(mC_vT) + C_pT_2 dm - p_a dV - \mu W_T dx_T$$

The last form holds since dm is non-zero only when $T = T_2$. This equation can be integrated from the initial state to the final state where both vehicles are at rest. Since the air mass m in the final state is zero, the integral of $d(mC_vT)$ is $-m_0 C_v T_a$, where $m_0$ is the initial mass $p_a AL/(RT_a)$. The integral of $C_pT_2 dm$ is $-C_pT_2 m_0$. The integral of $p_a dV$ is $-p_a AL$, and the integral of $\mu W_T dx_T$ is $\mu W_T x_T$, where $x_T$ is the total motion of the truck. When these are substituted in and the relations $C_v + R = C_p$ and $(\gamma-1)C_p = \gamma R$ are used, the equation can be rearranged to yield $$x_T = \frac{1}{\mu W_T}\left[\frac{W}{g}\frac{\dot{x}_0^2}{2} - \frac{\gamma}{\gamma-1}p_a ALT_2 - \frac{T_a}{T_a}\right] \quad (21)$$

EXAMPLE

With the input $W_T$=16000 lbs, W=4400 lbs, A=24 square feet (3 feet by 8 feet), L=10 feet, $\dot{x}_0$=62 mph, $\mu$=0.7, $p_a$=14.7 psia, $T_a$=68 F, $C_D$=0.6, $\gamma$=1.4, R=1716.5 fps²/R,

| | |
|---|---|
| $P_1$=17.94 psia | Equation (9) |
| $X_1$=1.33 feet | Equation (10) |
| $\dot{x}_1$=61.6 mph | Equation (11) |
| $x_{2-xT2}$=4.41 feet | Equation (15) |
| $p_2$=33.2 psia | Equation (13) |
| $\dot{x}_2-\dot{x}_{T2}$=54.6 mph | Equation (14) |
| $T_2$=206 F | Equation (17) |
| $A_{o_1max}$=4.37 square feet | Equation (20) |
| $X_T$=8.9 feet | Equation (21) |

I claim:

1. A crash attenuator which receives an impact force from a moving object and dissipates the impact energy of the object to thereby reduce the velocity of the object comprising a frame mountable to a truck or stationary structure, a bumper having an impact-receiving face adapted to receive the impact from the object in a crash, a movable displacement structure coupled to said frame and interposed between said frame and said bumper and having a first position in which said bumper is relatively distant from said frame and a second position in which said bumper is relatively proximate to said frame, and energy dissipation means coupled to said displacement structure for dissipating at least some of the impact energy of the object received by said bumper which causes said displacement structure to be moved from the first position toward the second position and thereby reducing the velocity of the object, wherein said energy dissipation means are structured and arranged to provide an energy dissipation force for dissipating the impact energy of the object based on deceleration of the object.

2. The crash attenuator of claim 1, wherein said displacement structure is a collapsible structure composed of a plurality of members arranged to provide said collapsible structure with a contracted position corresponding to the second position of said displacement structure and an expanded position corresponding to the first position of the displacement structure.

3. The crash attenuator of claim 1, wherein said displacement structure is movable back to the first position from the second position such that the crash attenuator is reusable.

4. The crash attenuator of claim 1, wherein said energy dissipation means are arranged to regulate movement of said displacement structure from the first position toward the second position such that the energy dissipation force for dissipating the impact energy of the object is variable.

5. The crash attenuator of claim 1, further comprising deceleration sensing means for continuously sensing the deceleration of the object after impact into said bumper to determine an instantaneous deceleration of the object and said energy dissipation means are arranged to vary the energy dissipation force based on the instantaneous deceleration of the object.

6. The crash attenuator of claim 1, wherein said energy dissipation means comprise at least one hydraulic mechanism mounted on said displacement structure, said at least one hydraulic mechanism comprising at least one hydraulic cylinder including a housing and a piston movable into and out of said housing.

7. The crash attenuator of claim 6, wherein said at least one hydraulic cylinder includes an electronically controlled valve having a variable orifice such that the flow of the fluid out of a space between said piston and said housing is controlled by varying the size of said orifice.

8. The crash attenuator of claim 1, wherein said energy dissipation means comprise at least one inflatable airbag arranged between said bumper and said frame, further comprising a pump for inflating said at least one airbag with fluid.

9. The crash attenuator of claim 8, wherein said energy dissipation means further comprise a pneumatic device having a flow line in flow communication with an interior of said at least one airbag, the flow of fluid through said flow line from the interior of said at least one airbag being regulatable based on the sensed deceleration of the object.

10. The crash attenuator of claim 1, further comprising anticipatory sensing means for sensing impending impact of the object with said bumper prior to actual impact of the object with said bumper and determining information about the object, said energy dissipation means being controlled to provide the energy dissipation force based on the determined information about the object.

11. The crash attenuator of claim 10, wherein said energy dissipation means are set to provide an energy dissipation force based on the determined information about the object prior to actual impact of the object with said bumper.

12. The crash attenuator of claim 1, wherein said energy dissipation means comprise at least one inflatable airbag arranged between said bumper and said frame, further comprising a pump for inflating said at least one airbag with fluid.

13. The crash attenuator of claim 12, further comprising anticipatory sensing means for sensing impending impact of the object into said bumper prior to actual impact of the object into said bumper, and gas-injecting means responsive to the sensed impact of the object for injecting additional gas into said at least one airbag prior to the impact of the object.

14. The crash attenuator of claim 13, wherein said gas-injecting means comprises a pyrotechnic material.

15. A method for protecting a truck or fixed structure from damage resulting upon impact of a moving object with the truck or structure, comprising the steps of:

mounting a movable displacement structure to the truck or structure, the displacement structure having an expanded position and a contracted position, arranging a bumper having an impact-receiving face adapted to receive the impact from the moving object on the displacement structure, expanding the displacement structure to its expanded position, and dissipating at least some of the impact energy of the moving object and reducing the velocity of the moving object by adjusting an energy dissipation force which dissipates the impact energy of the moving object.

16. The method of claim 15, further comprising the step of:
  expanding the displacement structure after the impact energy of the object is dissipated such that the crash attenuator is reusable.

17. The method of claim 15, further comprising the step of:
  sensing deceleration of the object after impact into the bumper, and
  adjusting the energy dissipation force based on the sensed deceleration of the object.

18. The method of claim 15, further comprising the steps of:
  mounting at least one hydraulic mechanism on the displacement structure, the at least one hydraulic mechanism comprising at least one hydraulic cylinder including a housing and a piston movable into and out of the housing, and
  adjusting the energy dissipation force by controlling the flow of a fluid out of a space between the piston and the housing.

19. The method of claim 15, further comprising the steps of:
  arranging at least one inflatable airbag on the displacement structure;
  inflating the at least one airbag with fluid; and
  adjusting the energy dissipation force by regulating the flow of the fluid from the at least one airbag.

20. The method of claim 15, further comprising the steps of:
  arranging at least one inflatable airbag on the displacement structure;
  inflating the at least one airbag with fluid;
  sensing deceleration of the object after impact into the bumper; and
  initiating a pyrotechnic inflator to increase the pressure in the airbag based on the sensed deceleration of the object.

21. The method of claim 15, further comprising the steps of:
  sensing motion of the object after impact into the bumper, and
  adjusting the energy dissipation force in order to decelerate the object at a calculated rate.

22. A crash attenuator which receives an impact force from a moving object and dissipates the impact energy of the object to thereby reduce the velocity of the object, comprising
  a frame mountable to a truck or stationary structure,
  a bumper having an impact-receiving face adapted to receive the impact from the object in a crash,
  a movable displacement structure coupled to said frame and interposed between said frame and said bumper and having a first position in which said bumper is relatively distant from said frame and a second position in which said bumper is relatively proximate to said frame,
  energy dissipation means coupled to said displacement structure for dissipating at least some of the impact energy of the object received by said bumper which causes said displacement structure to be moved from the first position toward the second position and thereby reducing the velocity of the object, and
  means for sensing motion of the object after impact with said bumper and controlling said energy dissipation means to provide a variable energy dissipation force in order to decelerate the object at a calculated rate.

23. A crash attenuator which receives an impact force from a moving object and dissipates the impact energy of the object to thereby reduce the velocity of the object, comprising
  a frame mountable to a truck or stationary structure,
  a bumper having an impact-receiving face adapted to receive the impact from the object in a crash,
  a movable displacement structure coupled to said frame and interposed between said frame and said bumper and having a first position in which said bumper is relatively distant from said frame and a second position in which said bumper is relatively proximate to said frame,
  energy dissipation means coupled to said displacement structure for dissipating at least some of the impact energy of the object received by said bumper which causes said displacement structure to be moved from the first position toward the second position and thereby reducing the velocity of the object, said energy dissipation means being arranged to provide an energy dissipation force for dissipating the impact energy of the object,
  control means for controlling the energy dissipation force.

24. The crash attenuator of claim 23, wherein said control means comprises a pyrotechnic inflator.

25. The crash attenuator of claim 23, wherein said energy dissipation means comprise at least one hydraulic mechanism mounted on said displacement structure, said at least one hydraulic mechanism comprising at least one hydraulic cylinder including a housing and a piston movable into and out of said housing, the flow of a fluid out of a space between said piston and said housing being controlled in order to vary the energy dissipation force,
  said control means comprising a valve having a variable orifice such that the flow of the fluid out of a space between said piston and said housing is controlled by varying the size of said orifice.

* * * * *